Oct. 4, 1966

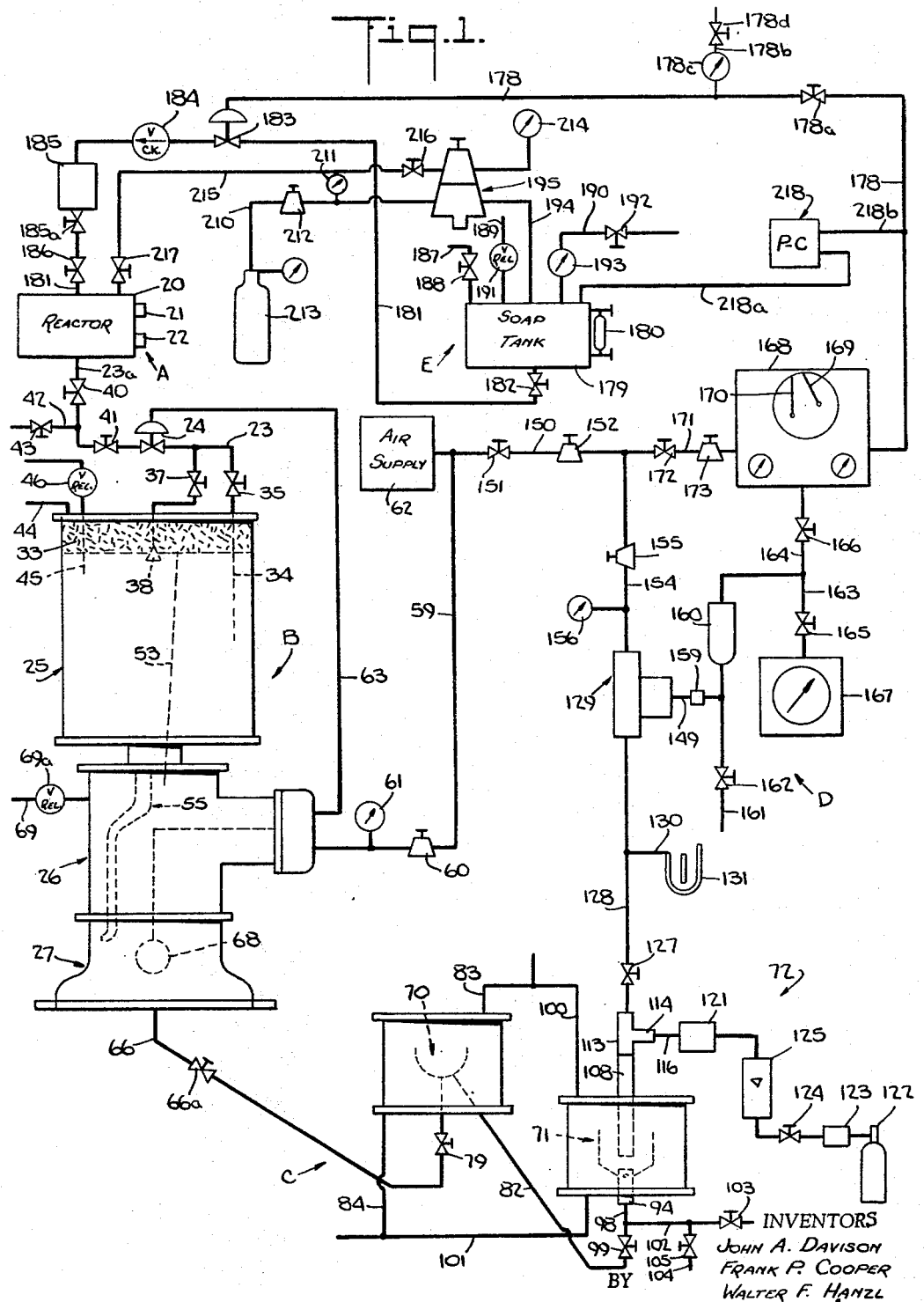

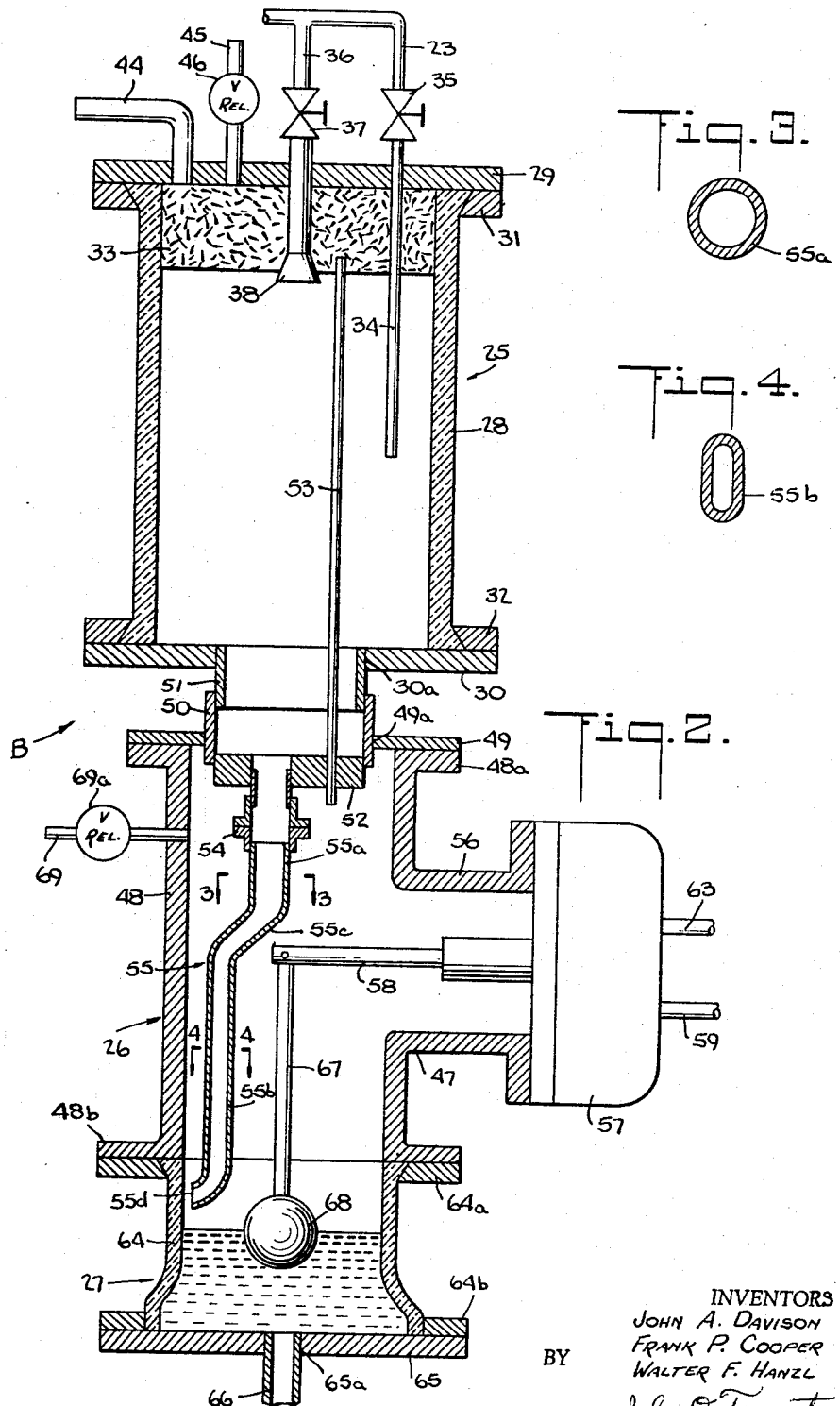

J. A. DAVISON ET AL 3,276,844

PROCESS CONTROL BY SURFACE TENSION MEASUREMENT

Filed Nov. 28, 1961

INVENTORS
JOHN A. DAVISON
FRANK P. COOPER
WALTER F. HANZL

BY John O. Tramontine
ATTORNEY

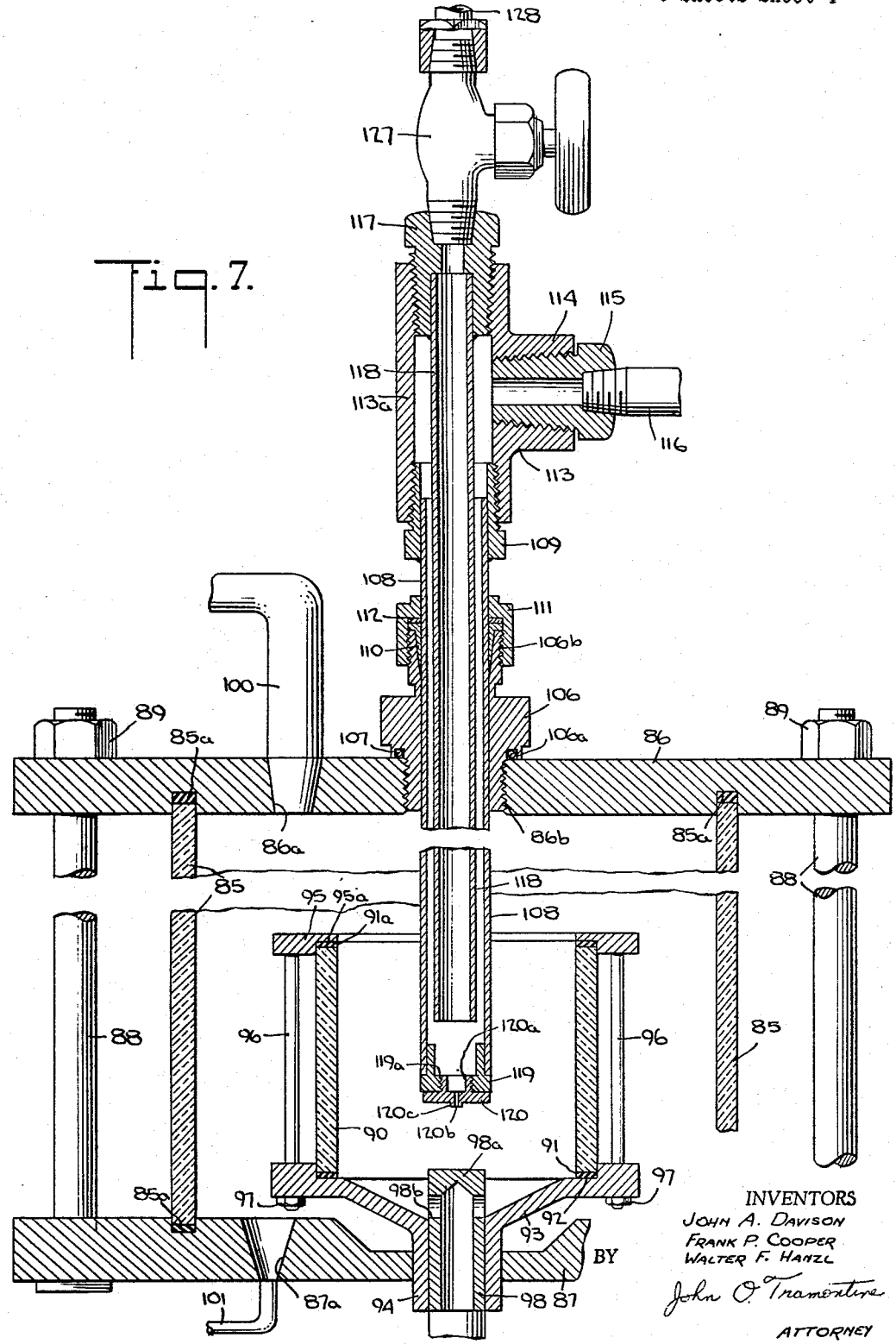

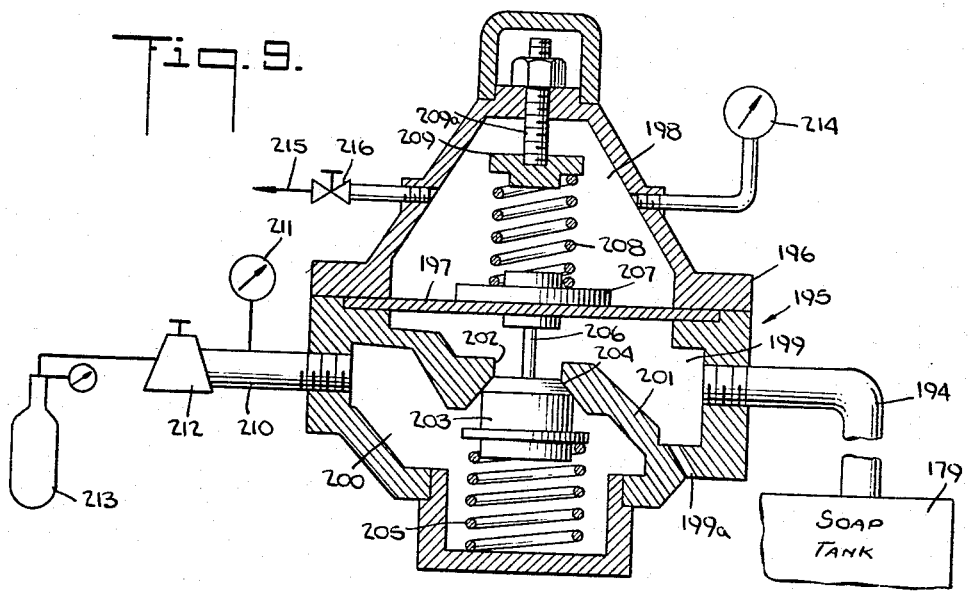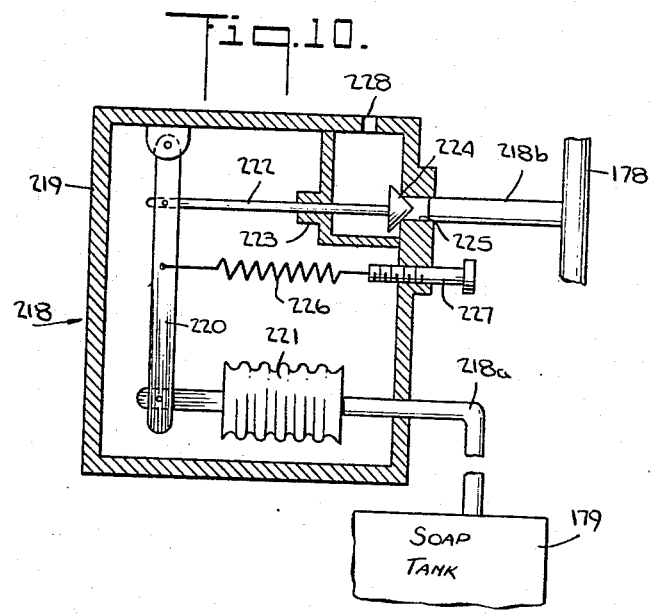

United States Patent Office 3,276,844
Patented Oct. 4, 1966

3,276,844
PROCESS CONTROL BY SURFACE TENSION MEASUREMENT
John A. Davison, Ridgewood, Frank P. Cooper, Wayne, and Walter F. Hanzl, Pompton Plains, N.J., assignors to United States Rubber Company, New York, N.Y., a corporation of New Jersey
Filed Nov. 28, 1961, Ser. No. 155,259
19 Claims. (Cl. 23—253)

This invention relates to improvements in emulsion polymerization reactions, as well as to a novel method of and apparatus for controlling such reactions.

Although, for purposes of illustration and facility of description, the following disclosure is directed specifically to the performance and control of emulsion polymerizations of polymerizable unsaturated monomers in the preparation of aqueous dispersions or latices of various synthetic resins and rubbery polymers, it is to be understood that the principles of the present invention are of broad and general utility and are not limited to emulsion polymerization reactions, and that the disclosure and particularly the claims appended hereto are to be interpreted in that light.

The manufacture of aqueous dispersions of various synthetic resins by the direct polymerization of polymerizable monomeric materials in an aqueous emulsion in the presence of soap as the emulsifying agent is well known. Processes of this type, as applied to the polymerization of such materials as styrenes, esters of acrylic acids, vinyl pyridine, vinyl esters of alkanoic acids, butadiene, and mixtures thereof, are disclosed in U.S. Patent No. 2,579,908 of J. A. Davison and W. R. Dunn, issued December 25, 1951. These processes are characterized by the fact that the reaction, in any given case, is initiated with a relatively low soap concentration in the reacting mass, ranging from about 0.5 to 2 parts of soap per 100 parts of polymerizable monomeric material, and that thereafter sufficient soap is added to the reacting mass at or before about 60% conversion of the starting monomeric material to increase the total soap content to about 3 to 6 parts per 100 parts of the original polymerizable material. The soap, of course, stabilizes the reaction foci or centers around which the polymer particles grow. Thus, the greater the soap concentration at the start of the reaction, the more polymer particles are formed.

In the manufacture of polymer latices, the principal problem to be solved is to obtain a latex which has as high a solids content as possible and yet a viscosity low enough to permit handling by ordinary equipment. It is well known that for a given solids content the viscosity of an aqueous emulsion polymerizate is inversely proportional to the average size of the polymer particles. Since, for a specified solids content, therefore, the viscosity of the latex increases as the size of the particles decreases, due to the fact that there are more particles present, the use of a limited amount of soap at the start of the reaction in the processes disclosed in the aforesaid Davison and Dunn patent enables the production of a latex having fewer polymer particles of a greater size, so that for the same solids content the resultant latex has a lower viscosity. Conversely, for the highest permissible viscosity, the larger particle size latex produced in accordance with the patented methods will have a greater solids content than the smaller particle size latex.

In these processes, as has already been noted, the balance of the soap required for the complete reaction is added at a later stage, preferably before 60% conversion of the original monomeric material, in order to prevent the dispersion from becoming unstable and flocculating. The criterion which determines the optimum point of the reaction at which the desired increase of soap concentration should be effected is an empirical one, however, this point being defined as such a stage that in a sample of the dispersion the monomers no longer form a separate layer on standing. There is, consequently, no positive control over the reaction at all times during the progress thereof, nor is the addition of the soap related in any precise and continuously determined manner to its consumption. It has also been found that a relatively large addition of soap made at one time, even when this is done after the reaction is 60% complete, will cause the formation of new reaction foci and thus decrease the average particle size of the product.

It is, therefore, an important object of the present invention to provide novel methods of and apparatus for controlling diverse chemical reactions and processes.

More specifically, it is an object of the present invention to provide improvements in emulsion polymerization reactions and in the control thereof.

Another object of the present invention is the provision of novel and highly efficient methods of and apparatus for controlling processes in which changes in the surface tension of the reacting mass are employed as indices of the demand for the addition of an ingredient to the reacting mass.

Still another object of the present invention is the provision of control methods and apparatus as aforesaid in which the surface tension changes are continuously sensed by measurements of the maximum pressures required to blow gas bubbles through a sample of the reacting mass.

A related object of the present invention is the provision of such methods and apparatus in which the surface tension change measurements are carried out on a continuously changing sample of the reacting mass.

A further object of the invention is to provide a novel sample extraction unit for use in the control of emulsion polymerization reactions, which sample extraction unit is adapted to provide for the purposes of the maximum bubble pressure surface tension measurements, a sample substantially free of entrapped vapors and gases.

It is also an object of the present invention to provide novel surface tension monitoring means for use in emulsion polymerization control as aforesaid, as well as means for maintaining in the source of supply of the soap to be added to the reacting mass in response to the operation of the surface tension monitoring means a pneumatic pressure which at all times during the progress of the reaction is a predetermined amount higher than the reaction pressure.

More particularly, the present invention is based on our discovery that it is possible to obtain, by means of a radical change in the commercial scale performance and control of known emulsion polymerization reactions, polymer latices which for a given solids content reproduceably and consistently have a lower viscosity and greater as well as more uniform particle size than do such latices produced by following the known procedures and techniques that are adaptable to commercial operation. At the same time, the invention leads to a considerable reduction in the amount of process labor which is required for the production of polymers by emulsion polymerization.

Specifically, we have found that these results and advantages are attained when the reaction, which may involve the polymerization of monomers which are initially gaseous or liquid, as well as the copolymerization of two or more such monomers, is initiated in the absence of any soap whatsoever and is under a continuous and automatic control which automatically adds soap to the reacting mass as demanded by the reaction, this demand being indicated by a rise in the surface tension of the reacting mass. The underlying basis for the procedure according to this invention is that in an emulsion polymerization system the soap molecules generally are distributed according to the following equilibrium:

(Surface of the polymer particles) ⇌ (Aqueous soap solution) ⇌ (Interface between air and soap solution)

As this equilibrium is shifted to the left by the demand of the growing polymer surfaces for more soap, the concentration of soap in the aqueous solution decreases and the surface tension of this phase rises. Consequently, more soap must be added to lower the surface tension of this phase and to reestablish the state of equilibrium at the desired level of tension at the interface between the air and the soap solution. According to the present invention this is done by controlling the addition of the soap proportionally to the differences between (a) the surface tension values of the reacting mass, as sensed by a maximum bubble pressure method measurement on a continuously extracted and changing sample, and (b) a predetermined set value of the surface tension. In this manner the invention ensures that there is always just enough soap in the aqueous solution phase to stabilize the growing polymer surfaces. The soap concentration, however, is low enough to minimize the formation of new polymer particles.

The principles of the present invention as well as other objects, characteristics and advantages thereof will be more clearly understood from the following detailed description when read in conjunction with the accompanying drawings, in which:

FIG. 1 is a schematic illustration of an apparatus for continuously controlling an emulsion polymerization reaction by means of surface tension measurements in accordance with the present invention;

FIG. 2 is a sectional view of a sample extraction unit for use with the apparatus shown in FIG 1;

FIG. 3 is a sectional view taken along the line 3—3 in FIG. 2;

FIG. 4 is a sectional view taken along the line 4—4 in FIG. 2;

FIG. 7 is a vertical sectional view of a bubble cell and pressure sensing device of the surface tension monitoring unit of the apparatus shown in FIG. 1;

FIG. 8 is a schematic illustration of the surface tension indicating and control unit of the apparatus of FIG. 1;

FIG. 9 is a sectional view illustrating details of a differential pressure regulator constituting a part of the soap addition unit of the apparatus of FIG. 1; and FIG. 10 is a sectional view of a pressure controller incorporated in the apparatus as a safety feature.

Figure 5:
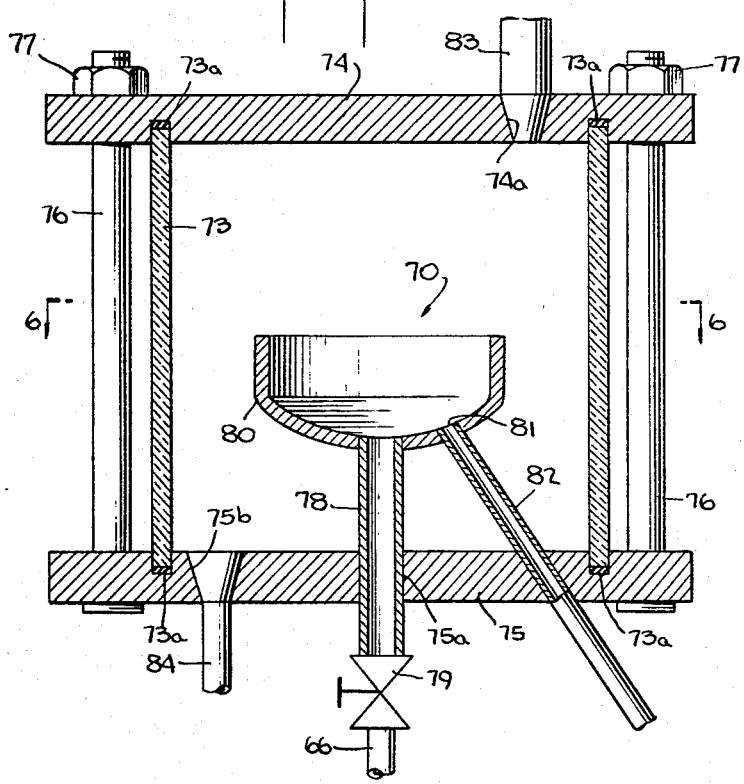
FIG. 5 is a sectional view taken along the line 5—5 in FIG. 6 and illustrates an overflow cell constituting a part of a surface tension monitoring unit of the apparatus of FIG. 1.

Referring now in particular to FIG. 1 it will be seen that the overall emulsion polymerization system including the control apparatus according to the preesnt invention comprises a plurality of units each of which will be more fully described in detail hereinafter. As clearly shown, the control apparatus for the reaction unit A comprises a sample extraction unit B, a surface tension monitoring unit C, a surface tension indicating and control unit D, and a soap addition unit E which is adapted to introduce additional soap into the reaction unit A, as required by the reaction, in response to signals generated by the indicating and control unit D.

The reaction unit A comprises a reactor 20 which may be of any suitable construction and is indicated only schematically in FIG. 1. Merely by way of example, the reactor 20 may be an autoclave provided with conventional temperature and pressure control means 21 and 22 and with other adjuncts (not shown) such as agitating means, gauges, valves, etc. In view of the fact that the nature of the reactor 20 constitutes no part of the present invention, it will not be more explicitly described herein.

THE SAMPLE EXTRACTION UNIT

As clearly shown in FIGS. 1 and 2, the sample extraction unit B comprises a flow line 23, a control valve 24, preferably a remote controlled air-operated "Saunders" or "Uniflow" diaphragm valve, incorporated in the flow line, a desorption column 25 for removing entrapped and dissolved gases from the sample, a sample transfer and flow control section 26, and a sample-accumulating chamber 27. The inlet end of the sample flow line 23, which may, for example, a ⅜ inch outer diameter flexible stainless steel tubing, is connected to a bottom outlet of the reactor 20, as shown at 23a, while the other end of the flow line is connected in a manner still to be described to the desorption column 25.

Referring now specifically to FIG. 2, the desorption column 25 comprises a high strength and high temperature-resistant glass pipe 28 the top and bottom ends of which are covered by stainless steel plates 29 and 30. The pipe 28, which is fixed to the plates 29 and 30 by means of annular flanges 31 and 32, preferably is about 24 inches long and about 12 inches in diameter. The column is packed over substantially its entire length with high density polyethylene "Tellerettes" (not shown) atop of which is provided a 2 inch high section of "Demister" wire mesh packing 33 covering the entire cross-sectional width of the column. Extending into the column 25 about half way down in to the packed section of the pipe 28 is a delivery tube 34 which extends through the wire mesh packing 33 and the top plate 29 and is connected through a manually operable valve 35 with the sample flow line 23.

Branched from the flow line 23 is a pipe 36 in which is incorporated a valve 37, the pipe 36 extending through the top plate 29 of the column 25 and the wire mesh packing 33 and terminating at a point just below the latter in a spray nozzle 38. The sample line 23 is additionally provided (see FIG. 1) with a pair of manually operable valves 40 and 41, and a water line 42 controlled by a valve 43 communicates with the sample line 23 intermediate the valves 40 and 41. The water line 42 and the nozzle 38 are adapted for use in cleaning the desorption column 25, and thus under ordinary operating conditions the valves 37 and 43 are always closed while the valves 40 and 41 are open. The column 25 is vented at its top to any suitable gas disposal system (not shown) by means of a pipe 44 and is further provided at its top with a second vent line 45 controlled by a relief valve 46 set for approximately 15 p.s.i.g. The bottom plate 30 of the column 25 is provided with a central opening 30a (see FIG. 2).

The sample transfer and flow control section 26 comprises a four inch stainless steel pipe T 47 the run 48 of which is disposed vertically and below the desorption column 25. The upper end flange 48a of the run 48 of the T 47 is covered by a plate 49 which is provided with a central opening 49a. Extending through the opening 49a and affixed to the plate 49 is a short coupling 50 which is connected at its upper end to the bottom end of a short nipple 51 the upper end of which is connected to the bottom plate 30 of the column 25 at the opening 30a.

The lowermost end of the assembly 50–51 connecting the desorption column 25 with the T 47 is closed by a plug 52 in which are provided two openings. Extending through the smaller one of these openings and terminating just below the lower surface of the plug 52 is a relatively narrow stainless steel vent tube 53 which extends upwardly through the "Tellerette" packed section of the column 25 and terminates substantially at the lower surface of the wire mesh packing 33. Connected to the plug 52 at the other and wider opening thereof is a nipple and union 54 the lowermost end of which is connected to one end of a specially shaped sample delivery or transfer tube 55. As clearly shown in FIGS. 2, 3, and 4, the tube 55 at its uppermost portion 55a is substantially circular in cross-section with an outer diameter of about 1 inch, The lowermost section 55b of the tube 55 is flattened out and deformed to have a substantially oval cross-section. The sections 55a and 55b are joined by an angularly bent transition section 55c which provides a gradual change of tube cross-section from circular to oval and disposes the lower section 55b laterally offset relative to the upper section 55a. The lengths of the upper, transition and lower sections of the tube 55 are approximately 1.5 inches, 2 inches and 5 inches, respectively, and the bottom end 55d of the lower tube section 55b is disposed just below the plane of the bottom flange 48b of the run 48 of the T 47. Tube 55 is bent so that its bottom end 55d falls in a plane that is parallel to the axis of the run 48 of the T 47.

Affixed to the end of the bull 56 of the T 47 is a pneumatic signal-emitting controller 57 which is provided with an operating arm 58 extending approximately to the center of the T 47. The controller 57 communicates (see FIG. 1) via an air inlet line 59, provided with a filter-equipped pressure regulator 60 and a pressure gauge 61, with an air supply 62. An air signal line 63 connects the output side of the controller 57 to the diaphragm operating mechanism of the sample flow control valve 24.

The sample-accumulating chamber 27 comprises a high strength and high temperature-resistant glass reducer tube 64, about 6 inches long with a 4 inch upper and 6 inch lower diameter, the upper end of which is attached to the lower flange 48b of the T 47 by means of a split flange 64a and the lower end of which is covered by an end plate 65 having a central opening 65a and attached to the tube 64 by means of a split flange 64b. A conduit 66, made of ½ inch stainless steel pipe, for example, is connected to the chamber 27 via the opening 65a. Pivotally suspended from the operating arm 58 of the controller 57 is an arm 67 to the lowermost end of which is attached a float 68 adapted to sense the level of the accumulated sample in the chamber 27. The arrangement is such that when there is enough of the extracted sample in the chamber 27 to dispose the float about half-way down the glass tube 64, the arm 58 is in its neutral position and the controller 57 is inoperative. Since no signal reaches the valve 24 at such a time, it remains closed. If the level of the sample falls below the desired point, the float causes the arm 58 to drop, whereby the controller is rendered operative and transmits a pressure signal to the valve 24 to open the same and permit more sample to be extracted from the reactor 20 until the desired level of accumulated sample in the chamber 27 is reestablished. As will be apparent from FIG. 2, the sample transfer tube 55, the opening 55d of which is disposed substantially parallel to the tangent plane of the reducer tube 64 and not more than about ⅛ inch away from the inner surface of the latter, ensures that any portion of the sample flowing under the force of gravity into the chamber 27 enters the latter slowly, i.e. not in free falling condition, and without causing any turbulence therein, thereby preventing the possibility of surging and consequent erratic movements of the float.

In order to prevent undue pressure build-ups in the sample transfer section 26 and the chamber 27, there is provided near the upper end of the run 48 of the T 47 a vent line 69 controlled by a pressure relief valve 69a set for approximately 15 p.s.i.g.

THE SURFACE TENSION MONITORING UNIT

Figure 6:
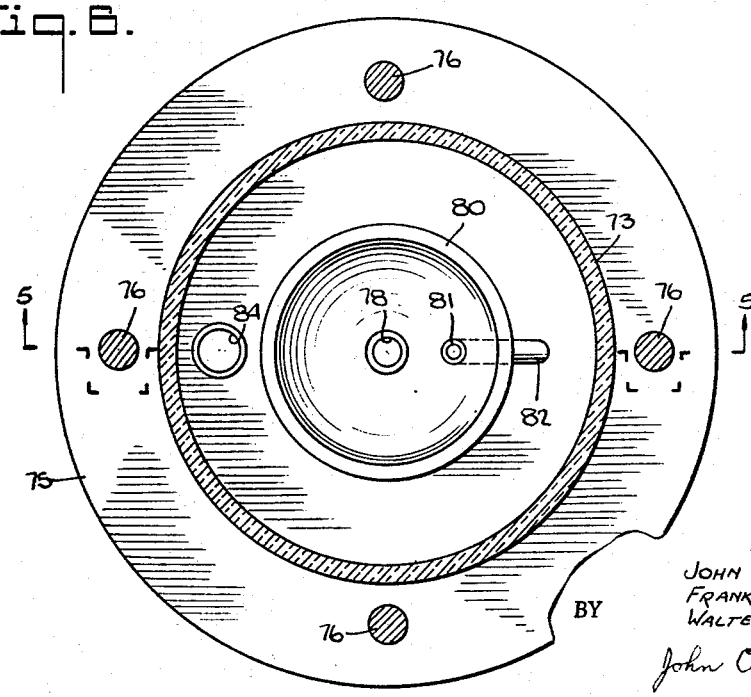
FIG. 6 is a sectional view taken along the line 6—6 in FIG. 5.
Figure 5:
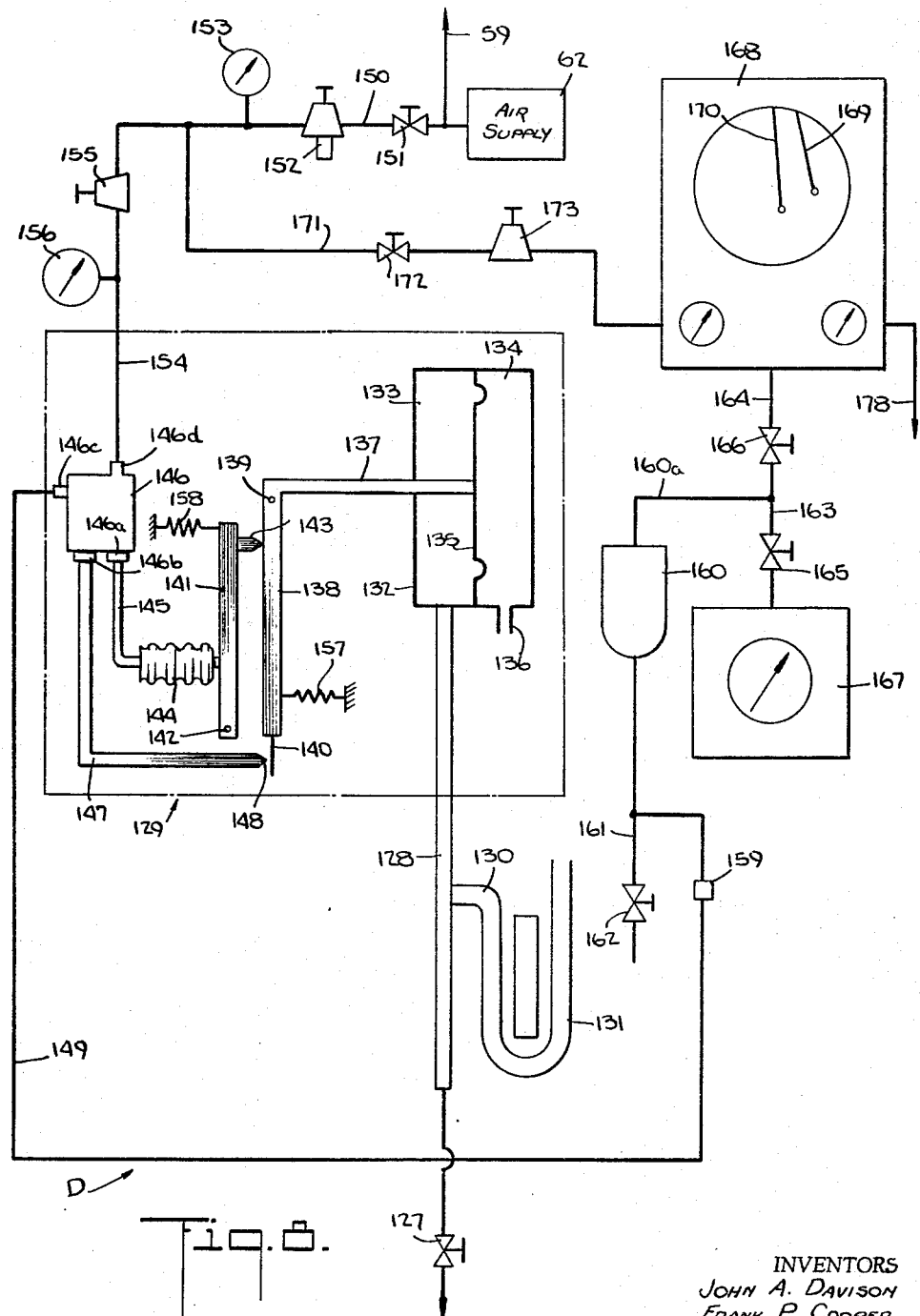

The extracted, gas-free sample of the reacting mass is adapted to be transferred by the conduit 66 (see FIG. 1) equipped with a manually operable valve 66a to the surface tension monitoring unit C which essentially comprises an overflow cell 70, a bubble cell 71, and a pressure system 72 which provides the bubble-forming air or other gas and also senses the maximum pressures required to form the bubbles as an index of the surface tension changes in the extracted sample of the reacting mass. Referring now more particularly to FIGS. 5 and 6 in conjunction with FIG. 1, it will be seen that the overflow cell 70 is enclosed in a housing constituted by a cylindrical glass tube 73 the upper and lower ends of which are closed by respective stainless steel end plates 74 and 75, these plates being provided with annular grooves fitted with "Teflon" ring gaskets 73a and receiving the opposite end edges of the tube 73. The end plates 74 and 75 are locked to one another by means of four bolts 76 and associated nuts 77.

The lower plate 75 is provided with a central aperture 75a through which extends a vertical pipe 78 the lower end of which located exteriorly of the overflow cell housing is controlled by a valve 79 connected to the sample transfer line 66. At its upper end the pipe 78 carries an open-topped cup 80 made of stainless steel and having a capacity, for example, of about 50 milliliters. At a point adjacent its bottom the cup 80 is provided with an outlet opening 81 which communicates with a conduit 82 leading to the bubble cell 71 (still to be described). The interior of the overflow cell housing 73–74–75 is vented to the atmosphere by means of a vent line 83 connected to an opening 74a in the upper end plate 74, and a drain line 84 is connected to the housing via an opening 75b in the lower end plate 75.

The bubble cell 71 (see FIG. 7) is also enclosed in a housing constituted by a cylindrical glass tube 85 the opposite ends of which are closed by a pair of stainless steel plates 86 and 87 secured to one another by means of four bolts 88 and associated nuts 89, the plates 86 and 87 being provided with respective annular grooves fitted with "Teflon" ring gaskets 85a and receiving the opposite end edges of the cylindrical tube 85. The bubble cell 71 comprises a cylindrical glass tube 90 about 2½ inches in diameter and about 2⅜ inches long the lower edge of which rests on a "Teflon" ring gasket 91 supported by a peripheral flange or shoulder 92 of a conically shaped base element 93. The latter at its lower end has a bushing 94 which extends through and is fixedly supported by the lower plate 87 of the bubble cell housing. The uppermost edge of the glass cylinder 90 is received together with a "Teflon" ring gasket 91a in an annular shoulder 95a of a stainless steel rim 95 which is secured to the base element 93 by means of four bolts 96 and associated nuts 97. Extending axially through the bushing 94 of the base element 93 is a short pipe 98 having a closed upper end 98a and a plurality of peripheral outlet openings 98b adjacent the said end just above the bottom of the base element 93. The lowermost end of the pipe 98 is connected with the transfer line 82 from the overflow cell 70 by means of a manually operable valve 99 (see FIG. 1).

As clearly shown in FIG. 1, the arrangement of the overflow cell 70 and bubble cell 71 of the surface tension monitoring unit C is such that the upper lip of the cup 80 is disposed at a predetermined height, preferably about 2 inches, above the upper lip of the bubble cell vessel 90–93–95. This difference in height, which is maintained constant by any suitable supporting structure (not shown) for the cells, determines the head under which the extracted sample is propelled into the bubble cell. Thus, the difference in height ensures that there will be a continuous overflowing of the sample from the bubble cell vessel so that the collected quantity of the extracted sample in the said vessel is continuously changing and thus always representative of the state of the reacting mass at that time both as to surface tension and degree of conversion of the polymerizable monomeric materials.

Referring again to FIG. 7, the interior of the bubble cell housing 85–86–87 is vented to the atmosphere by means of a vent line 100 connected to an opening 86a in the upper end plate 86 of the housing. In actual practice it is essential, however, that the interiors of the housings 73–74–75 and 85–86–87 be kept as nearly as possible at the same pressure. To this end, the vent lines 83 and 100 are joined to one another (see FIG. 1) by the shortest possible lengths of tubing.

Removal of overflowed sample from the bubble cell housing is effected by means of a drain line 101 connected to an opening 87a in the bottom end plate 87 of the housing. To facilitate waste disposal, the line 101 is preferably connected to the drain line 84 of the overflow cell housing (see FIG. 1). Cleaning of the bubble and overflow cells may be effected with the aid of a water line 102 which is connected to the inlet pipe 98 of the bubble cell and controlled by a manually operable valve 103. A suitable drain-out connection 104 controlled by a valve 105 is provided in the line 102 between the valve 103 and the pipe 98.

As hereinbefore indicated, the pressure system 72 associated with the surface tension monitoring unit C comprises means for supplying bubble-forming pulses of gas under pressure to the bubble cell 71, and means for sensing the maximum pressures required for forming the bubbles in the liquid sample of the reacting mass collected within the bubble cell vessel 90-93-95. Referring further to FIG. 7, it will be seen that the upper end plate 86 of the bubble cell housing is provided with a central threaded opening 86b into which is screwed a gland 106 so that a shoulder 106a thereof is in contact with the upper surface of the plate 86. A soft rubber O-ring 107 is suitably interposed between the shoulder 106a and the plate 86. Extending slidably through the gland 106 is an elongated stainless steel pipe 108 the lowermost end of which is disposed within the confines of the bubble cell 71 and the upper end of which is fixedly connected, as by welding, with an externally threaded nipple or union 109. The tube or pipe 108 may be locked in position relative to the bubble cell by means of a wedge-shaped gasket 110 which surrounds the pipe 108 and is disposed within the confines of an externally threaded nipple 106b extending upwardly from the gland 106, and a clamp nut 111 which surrounds the pipe 108 and is internally threaded so as to be capable of being screwed onto the nipple 106b of the gland 106. A sealing gasket 112 is preferably interposed between the clamp nut 111 and the uppermost flange of the wedge gasket 110.

The threaded portion of the nipple 109 is screwed into the lower end of the run 113a of a T member 113 into the bull 114 of which is screwed a threaded adapter coupling 115. The latter is connected with a conduit 116 which leads to a compressed gas source for supplying the bubble-forming pulses of pressurized gas, as will be more fully described presently.

Screwed into the upper end of the run 113a of the T member 113 is an adapter coupling 117 which is affixed in its lower region, as by welding, to an elongated pipe or tube 118 extending downwardly through and concentrically with the gas supply tube 108. The pipe 118 terminates a short distance, say between ¼ inch and ⅜ inch, above the lower end of the outer pipe 108, and its lowermost end region thus is also disposed within the confines of the bubble cell 71. The pipe 118, in a manner still to be described, constitutes a part of the pressure sensing means.

Affixed to the lowermost end of the pipe 108, as by being threaded thereinto, is a cap member 119 which is provided with a threaded opening 119a into which is screwed an externally threaded bushing of an orifice plate 120, the bushing having therein a relatively large bore 120a about 0.187 inch in diameter which communicates with a relatively narrow orifice 120b in the body of the plate 120. The diameter of the orifice may range from about 0.010 inch to about 0.030 inch. The lowermost end of the orifice 120b is surrounded by and defined in a small projection 120c the wall thickness of which may range from about 0.007 inch to about 0.010 inch and the length of which from the lower surface of the plate 120 is about 0.015 inch. The outer surface of this projection is highly polished to ensure reproduceability of the maximum pressure required to blow bubbles at any given surface tension.

From the foregoing it will be understood, therefore, that when the parts 108 to 120 are assembled as described, they form a rigid unit which can be moved longitudinally through the gland 106 and which can be locked in a fixed relationship with respect to the latter by means of the compression fitting constituted by the clamp nut 111 and the wedge 110. In this manner it is possible to position the lowermost end of the orifice plate 120 precisely within and at a predetermined distance, ranging from about ¾ inch to 2½ inches or more, below the top rim 95 of the bubble cell vessel 90-93-95, so as to effect any desired degree of immersion of the orifice 120b in the quantity of the extracted sample collected in the said vessel. At the same time, this construction enables the entire unit to be removed bodily from the bubble cell 71 and the housing 85-86-87 thereof, for example for cleaning or inspection, without any disturbance of the relationship of the tubes or pipes 108 and 118 to one another. This is achieved by simply unscrewing the gland 106 from the plate 86. As a consequence thereof, when the gland 106 is thereafter again screwed into plate 86, the orifice plate 120 will again be positioned at its predetermined location below the rim 95.

Referring again to FIG. 1, it will be seen that the conduit 116 which leads into the bull 114 of the T 113 is connected to a wire screen gas filter 121 which in turn is connected to a regulated compressed gas supply 122 through a restricted orifice 123, a control valve 124 and a flow meter 125, so that the arrangement is capable of delivering from 10 or less to 100 or more bubbles per minute at the orifice 120b.

At the upper end of the run 113a of the T member 113, the adapter coupling 117 is connected with one port of a manually operable valve 127 the other port of which is connected to a conduit 128 leading to a pressure transducer 129. The transducer, which is schematically indicated in the broken-line rectangle in FIG. 8, constitutes a part of the surface tension indicating and control unit D (still to be described). The line 128 at a point intermediate the valve 127 and the transducer 129 is connected via a branch 130 to a U-tube manometer 131 the main function of which is to serve as a pressure relief valve to protect against undue pressure build-up in any portion of the pressure sensing system. The height of the open leg of the manometer and the density of the manometer fluid are so chosen that a pressure of approximately 10 inches of water will blow the fluid from the U-tube, thus venting the system.

THE SURFACE TENSION INDICATING AND CONTROL UNIT

As previously mentioned, the surface tension indicating and control unit D receives from the monitoring unit C via the line 128 pressure pulses the magnitudes of which correspond, for reasons to be more fully explained hereinafter, to the maximum pressures required for forming the gas bubbles in the quantity of the extracted sample of the reacting mass collected in the bubble cell 71. The pulse-receiving pressure transducer 129 (see FIG. 8) comprises a casing 132 divided into two chambers 133 and 134 by a diaphragm 135. The chamber 133 is in communication with the conduit 128, and the chamber 134 is vented to the atmosphere at 136. The diaphragm is connected by means of a link arm 137 with a lever 138 pivoted at 139 adjacent its junction with the link arm 137 and provided at its other end with a small vane 140. Juxtaposed to the lever 138 is a second lever 141 which is pivoted adjacent one end at 142 and carries a longitudinally adjustable fulcrum member 143 the point of which bears against the lever 138 adjacent the pivot 139 of the latter. A pressure bellows 144 bears against the lever 141 intermediate the ends of the latter, and its interior is in communication via a conduit 145 with a loading chamber 146 at an outlet port 146a of the latter. To a second outlet port 146b of the loading chamber 146 is connected a conduit 147 which terminates in a nozzle 148 located in close proximity to the vane 140. A third outlet port 146c of the loading chamber 146 is connected by a conduit 149 to the remainder of the surface tension indicating and control unit D. Control air at 20 p.s.i.g. is fed into the loading chamber 146 through an air inlet port 146d thereof from the air supply 62 via a line 150 provided with a valve 151, a filter-equipped pressure regulator 152 and a pressure gauge 153, and a line 154 provided with a pressure regulator 155 and a pressure gauge 156. A small suppression spring 157 is connected to the lever 138 adjacent the free end thereof, and a zero adjusting spring 158 is connected to the free end of the lever 141, these springs being used in the calibration of the system. The elements 140, 144, 145, 146, 147 and 148 are thus seen to make up a pressure relay for transforming the small bubble pressures into larger pressure signals.

The output signal line 149 of the transducer 129 is connected via a snubber or damping device 159 to an air-filled reservoir 160 which is also adapted to damp out pulsations in the air pressure signals and is provided with a drain-out line 161 controlled by a valve 162. The reservoir 160 communicates via a length of ¼ inch tubing 160a with two lines 163 and 164 provided with valves 165 and 166 and communicating, respectively, with a standard pressure indicator 167 calibrated in surface tension units, i.e. dynes per centimeter, and with a pressure recorder-controller 168 also calibrated in surface tension units, for example a unit produced by Brown Instrument Division of the Minneapolis-Honeywell Regulator Company under the designation Model 702P. The recorder-controller 168 is equipped with set point indicator means 169 adapted to be set to the desired value of pressure corresponding to the surface tension to be maintained in the reacting mass, and with a pen 170 responsive to the actual values of surface tension existing in the sample. Control air is fed to the recorder-controller from the air supply 62 through line 150 and line 171 which is provided with a valve 172 and a regulator 173. An output signal line 178 of the recorder-controller 168 serves to transmit the output pressure signals of the latter which are utilized in controlling the addition of soap to the reaction, as will now be described.

THE SOAP ADDITION UNIT

The soap addition unit E, which is schematically illustrated in toto in FIG. 1 and certain elements of which are shown in greater detail in FIGS. 9 and 10, basically comprises two parts, one for effecting the required transfer of soap, and one for maintaining a predetermined differential between the reactor and the source of supply of the soap. Referring first to FIG. 1, the said source of supply of soap comprises a 10 gallon steel tank 179 adapted to contain liquid soap to be added to the reacting mass in the reactor 20. The tank 179 is constructed for a maximum working pressure of about 250 p.s.i.g. and is provided with a standard liquid level sight gauge 180. The bottom outlet of the tank 179 is connected to a soap transfer line 181 which leads to a top inlet of the reactor. Arranged in the line 181 are a manually operable valve 182, a remote controlled air-operated "Saunders" or "Uniflow" diaphragm valve 183, a check valve 184, a flow meter 185 equipped with a valve 185a, and a manually operable valve 186. The function of the check valve 184 is to prevent any possible blow-back of foam or gases from the reactor in the event that the pressure in the reactor 20 ever happens to exceed the pressure in the soap tank 179. The valve 186 is used during calibration and in the starting of the system, but is usually open when a reaction is in progress. The output pressure signal line 178 of the recorder-controller 168 is connected to the diaphragm operating mechanism of the valve 183. Incorporated in the signal line 178 are a manually operable valve 178a and a branched vent line 178b containing an indicating pressure gauge 178c and a manually operable valve 178d.

Connected to the top of the soap supply tank 179 is a filling line 187 controlled by a valve 188, by means of which soap can be added to the tank. Also connected to the top of the tank are vent lines 189 and 190, the former having incorporated therein a pressure relief valve 191 set for 150 p.s.i.g., and the latter having incorporated therein a valve 192 and an indicating pressure gauge 193.

The top of the tank 179 further communicates via a line 194 with one port of a differential pressure regulator 195 (see FIG. 9). The differential pressure regulator 195 comprises a casing 196 divided by a flexible diaphragm 197 into a sensing chamber 198 and a control chamber which is divided into two sections 199 and 200 by a rigid partition 201. Communication between the sections 199 and 200 of the control chamber is established by means of an opening or aperture 202 in the partition 201, which opening is controlled by a valve member 203 adapted to engage a valve seat 204 surrounding the opening 202. The valve member 203 is seated atop a spring 205 which rests in a bottom well portion of the casing 196. The upper end of the valve member 203 is connected by means of a rod 206 and a bearing disc 207 to the diaphragm 197. The upper surface of the disc 207 is engaged by the lower end of a spring 208 the upper end of which is in contact with a disc 209 carried by an adjusting screw 209a arranged at the top of the casing 196. As will be readily understood, the screw 209a may be rotated to raise and lower the disc 209 so as to vary the pressure response characteristics of the diaphragm 197 accordingly.

As clearly shown in FIG. 9, the line 194 from the soap tank 179 communicates with the control chamber section 199 of the differential pressure regulator 195, this chamber section being vented to the atmosphere by means of a small weep hole or orifice 199a about 0.0135 inch in diameter. A conduit 210 in which are arranged a pressure gauge 211 and a regulator valve 212 establishes communication between the control chamber section 200 of the regulator 195 and a cylinder or other vessel 213 containing a supply of nitrogen or like inert gas under pressure. The sensing chamber 198 of the regulator 195 communicates on the one hand with a pressure gauge 214 and on the other via a line 215 controlled by a pair of valves 216 and 217 with the interior of the reactor 20 at the top thereof (see FIG. 1).

The operation of the differential pressure system is such that at all times during the progress of the reaction in the reactor 20 there exists in the soap supply tank 179 a pneumatic pressure which is a predetermined amount, say from 10 to 15 p.s.i.g., higher than the pressure in the reactor. This result is achieved by virtue of the fact that, with the reactor pressure acting on one side of the diaphragm 197 through the line 215 while the soap tank pressure acts on the other side of the diaphragm through the line 194, the bolt 209a can be positioned to impart to the spring 208 a degree of compression which permits the diaphragm to be deflected downwardly so as to open the valve 203–204 whenever the difference between the reactor pressure and the soap tank pressure becomes less than the aforesaid predetermined amount, which may occur either as a result of a rise in the reactor pressure or as a result of a drop in the soap tank pressure. When the valve 203–204 is so opened, additional nitrogen (or other inert gaseous fluid) is fed into the soap tank 179 from the cylinder 213 through the control chamber section 200, the opening 202 and the control chamber section 199 until the soap tank pressure is again sufficiently high above the reactor pressure to straighten out the diaphragm 197 and close the valve 203–204. On the other hand, should the difference between the reactor pressure and the soap tank pressure become too large, the tank pressure is permitted to drop automatically due to the fact that a small stream of the nitrogen is constantly escaping through the weep hole 199a.

Interconnected between the top of the soap tank 179 and the pressure signal line 178 is a pressure controller 218 (see FIGS. 1 and 10). The pressure controller 218 comprises a casing 219 from the top of which is pivotally suspended an arm 220. At its lower end the arm 220 is articulated to one end of a pressure bellows 221 the interior of which communicates through the line 218a with the soap tank 179. At a location closer to its pivoted end, the arm 220 is articulated to a rod 222 slidably supported in a suitable bushing 223 within the casing 219 and carrying at its free end a valve head 224 adapted to control an opening 225 provided in one wall of the casing 219. The opening communicates with the line 218b and through the latter with the pressure signal line 178. A spring 226 is connected at one end to the arm 220 intermediate the points at which the latter is articulated to the bellows 221 and valve rod 222, the other end of the spring being connected to an adjustable abutment 227. The interior of the casing is vented to the atmosphere by means of an opening 228.

The pressure controller 218 is actually not a part of the principal control system according to the present invention. It does, however, constitute an important safety device. In operation, should the pressure in the soap tank exceed a predetermined level, say 80 p.s.i.g., the corresponding expansion of the bellows 221 will cause the arm 220 to be pivoted clockwise as seen in FIG. 10 so as to retract the valve head 224 from the opening 225. The signal line 178 will, consequently, be vented to the atmosphere through the opening 228 so that no pressure reaches the control valve 183. The latter thus remains closed, and no soap can flow into the reactor.

OPERATION

The operation of the control system of this invention in controlling the progress of chemical reactions which are characterized by increases in the surface tension of the reacting mass as the reaction proceeds is as follows, it being understood that such a rise in surface tension generally is the result of the consumption of a surface-active ingredient, e.g. soap, during the reaction.

Referring now specifically to FIG. 1, for the purpose of this description it is assumed that an emulsion polymerization reaction is about to be started in the reactor 20. The recorder-controller 168 is set for a specified surface tension value, say 50 dynes/cm. The control valve 183 is initially closed, since as yet no signal is being emitted by the recorder-controller 168, but the control valve 24 is open due to the fact that the float 68 in the sample-accumulating chamber 27 is below its neutral position and actuates the controller 57 to apply an air pressure signal to the diaphragm of the valve 24. Finally, the valves 37, 43, 103, 105, 162, 178d, 188 and 192 are closed, while all the remaining manually operable valves are open.

It will be recalled that one of the aspects of the present invention is the initiation of an emulsion polymerization in the absence of any soap or emulsifying agent. At the start of the reaction, therefore, the surface tension of the reacting mass, which includes all the necessary ingredients except the soap, rises to a value above the set value indicated by the member 169 of the recorder-controller. As the reaction proceeds, a sample reflecting the surface tension state of the reacting mass flows out of the reactor 20 through the line 23 and the open valves 40, 41, 24 and 35 into the sample delivery tube 34. The sample leaves the delivery tube 34 about half way down the packed desorption column 25. In this column, any gases that were absorbed or dissolved in the liquid sample are permitted to "flash off," i.e. to desorb. Moreover, should the sample have a tendency to foam, due to the presence of entrapped vapors or gases, the column 25 also tends to rectify that situation, since the bubbles of such vapors and gases collapse on the polyethylene "Tellerettes" constituting the packing of the column. The desorbed gases or vapors rise through the column and pass through the wire mesh packing 33 at the top of the column, leaving the latter via the vent line 44. If any droplets of the liquid sample happen to be entrained by the upwardly escaping gases, the packing 33 ensures that such liquid will be removed from the gases.

The desorbed or gas-free liquid sample flows by gravity from the desorption column 25 into the specially shaped transfer tube 55 and from the latter into the accumulating chamber 27. As will be readily understood, the shaping of the tube 55 is such that the sample cannot fall freely into the accumulating chamber but is constrained to flow slowly and smoothly into the latter. This is of great importance to the accuracy of the entire control method, since it prevents surges in the quantity of liquid accumulated in the chamber 27 and thus erratic movements of the float 68. When the float 68 has risen to its neutral point, the controller 57 is rendered inoperative, and the consequent absence of pressure signals then causes the diaphragm control valve 24 in the sample flow line 23 to close. Thereafter, as the sample flows out of the chamber 27, the controller 57 will alternately increase and decrease the degree of opening of this valve in order to maintain a constant height of liquid sample in the chamber 27.

From the accumulating chamber 27 the extracted liquid sample flows through the line 66 into the overflow cup 80 of the overflow cell 70. From the cup 80 the sample flows through the opening 81 and conduit 82 into the vessel 90–93–95 of the bubble cell 71. As clearly shown in FIG. 1, the chamber 27 is sufficiently elevated above the lip of the overflow cup 80 that the latter is always filled to overflowing, and since the lip of the cup 80 is arranged at a predetermined height above the rim 95 of the bubble cell 71, the sample flows from the former into the latter under a constant head. In this manner, the bubble cell vessel 90–93–95 is also always filled to overflowing, whereby the top surface of the quantity of the extracted sample collected in the said vessel is maintained at a constant level above the location of the orifice 120b. Moreover, it will be apparent that with the illustrated arrangement the sample in the bubble cell vessel is always changing, being refreshed by sample newly withdrawn from the reactor.

Any conveniently available compressed gas may be used in the pressure system 72, as long as the gas does not dissolve in or react with the reaction medium. Where volatile flammable monomers, such as butadiene, are reacted, the use of inert gases, such as nitrogen, is indicated. The flow of gas must be regulated so that it is just sufficient in volume to blow a series of discrete bubbles, ranging from about 10 to 100 or more per minute and preferably from about 50 to 60 bubbles per minute, at the orifice 120b into the quantity of the liquid sample collected in the bubble cell. It will be understood that as gas is so forced into the tube 108 at any given instant, a bubble begins to form at the orifice. The increase in pressure thereafter causes the bubble to grow until it breaks away from the orifice and begins to rise to the surface of the liquid. The removal from the gas supply system of the incremental volume of gas making up the bubble again reduces the pressure. Thus, the pressure of the system passes through a maximum with every bubble formed. This maximum pressure required to blow a bubble in the liquid is essentially a function of the surface tension at the interface between the bubble and the liquid and of the depth of immersion of the orifice in the liquid, as is explained on pp. 396–400 of Weissberger (Ed.), "Physical Methods of Organic Chemistry," vol. I, part I, second edition, Interscience, New York, 1949. Since the orifice immersion is maintained constant, the maximum pressures required to blow the individual bubbles are effectively an index of the changes in the surface tension of the sample, and, of course, of the reacting mass during the progress of the reaction.

The fluctuations in pressure due to the formation of the bubbles are transmitted through the pressure sensing tube 118, valve 127 and line 128 to the U-tube manometer 131 and to the chamber 133 at one side of the diaphragm 135 in the pressure transducer 129. The manometer gives a visual indication of the pressure fluctuations and also serves as a pressure relief device which will be blown out in the even of an excessive build-up of pressure in the system. The pressure transducer 129 serves, through the intermediary of its relay arrangement 140–144–146–148, to amplify the pressure fluctuations arising in the surface tension monitoring unit, which are usually on the order of fractions of an inch of water, into air signals of suitable magnitude, on the order of pounds per square inch, to operate the recorder-controller 168. Referring to FIG. 8, and assuming an initial null or balanced condition of the transducer, as pressure is applied to the left face of the diaphragm 135, the latter is moved to the right and lever or beam 138 is rotated in a clockwise direction through the intermediary of the link 137. At the same time, a portion of the quantity of the pressurized air from the air supply 62 which enters the loading chamber 146 through the inlet port 146d thereof at about 20 p.s.i.g. is continually being blown out through the nozzle 148, the rate of flow of this portion of the air as well as the back pressure build-up in the chamber 146 depending on the spacing between the nozzle and the adjacent face of the vane 140. As the latter moves toward the nozzle, therefore, the pressure in the loading chamber 146 rises. This pressure rise is applied through the line 145 to the bellows 144 and thus produces, due to the expansion of the bellows, a clockwise rotation of the beam or lever 141. As a consequence thereof, the lever or beam 138 is rotated counterclockwise through the intermediary of the fulcrum member 143 so as to again increase the spacing between the vane 140 and the nozzle 148, and the arrangement is such that the pressure increase in the loading chamber 146 which is the result of the pressure increase applied to the diaphragm 135 is just sufficient to restore the transducer to its null or balanced condition, i.e. to return the lever 138 and the diaphragm 135 to their starting positions.

Inasmuch as the bubble-caused pressure increases applied to the diaphragm 135 are proportional to the surface tension values of the liquid sample, the pressure rises in the loading chamber 146, which are the result of the vane 140 repeatedly approaching the nozzle 148, are also proportional to the values of the surface tension of the sample. These pressure rises are transmitted as pressure signals through the outlet port 146c of the loading chamber 146 and the line 149 to the lines 163 and 164 and therethrough to the surface tension indicator 167 and the recorder-controller 168. The indicator 167 and the pen 170 of the recorder-controller now show that the surface tension in the reactor is not at the set value, but higher. The recorder-controller 168 further provides an output pressure signal or signals proportional to the differences between the measured surface tension values of the sample and the set point, i.e. the desired surface tension sought to be established in the reactor. These output pressure signals, ranging from about 3 to 15 p.s.i.g. in magnitude, are applied through the line 178 to the diaphragm of the control valve 183 in the soap addition line 181, and this valve is thereby opened so as to permit a flow of soap from the tank 179 to the reactor 20 sufficient to return the surface tension of the reacting mass substantially to the set value of 50 dynes/cm. The magnitudes of the pressure signals from the recorder-controller, being proportional to the deviation of the reacting mass from the desired norm or set point, control the extent of opening of the valve 183 and thus the rate of addition of soap to the reaction as demanded by the latter. During this time, of course, the differential pressure regulator 195 ensures that there is applied to the interior of the soap supply tank 179 a pneumatic pressure which is always a predetermined amount, say about 10 to 15 p.s.i.g., higher than the reactor pressure, as previously explained.

The maintenance of a predetermined pressure differential between the reactor 20 and the soap tank 179 is an important feature of the present invention. As is well known, in many reactions the pressure within the reactor varies from the start to the end of a run. It is possible, for example, that a reaction could start out under a pressure as high as 60 p.s.i.g. and terminate at a gauge pressure of almost zero. It will be apparent that if no provision were to be made for this eventuality, it would be impossible to regulate the addition of soap to the reacting mass during the course of the reaction. The differential pressure regulator 195 eliminates this potential drawback by ensuring that no matter what the pressure in the reactor is, the pressure in the soap supply tank is about 10 to 15 p.s.i.g. higher. In this manner, for any given degree of opening of the valve 183 the rate of flow of soap into the reactor in response to the consumption of soap in the reactor is always the same.

As the surface tension in the reactor falls in response to the addition of soap, the surface tension of the continuously changing collected quantity of the extracted sample in the bubble cell vessel 90–93–95 also falls, whereby the addition of soap is reduced or interrupted by the recorder-controller 168 until the surface tension again rises above the set point. The control over the reaction provided by the present invention is, consequently, continuous during the progress of the reaction and of such a character that at all times the amount of soap in the reactor is just sufficient to keep the growing polymer particle surfaces supplied, but not enough to form additional reaction foci for the initiation of new polymer particles. Maintaining the surface tension of emulsion polymerization reactions in a range of 45–65 dynes per centimeter will accomplish this result. As a consequence, the polymer latices produced in accordance with the principles of the present invention are characterized by a considerably greater and more uniform particle size and lower viscosity for a given solids content than are latices produced by known methods and techniques.

The following examples will serve to illustrate the principles of the present invention more clearly. All parts indicated in the examples are parts by weight.

*Example 1*

A styrene polymerization according to the invention was performed in a reactor the initial charge of which was composed of 100 parts of styrene monomer and 180 parts of water and also contained 0.3 part of MTM-4 (a mixture of tertiary mercaptan regulators) as a conventional polymerization regulator and 0.1 part of potassium persulfate as a conventional polymerization catalyst. As described, the initial charge included no soap at all. The reactor contents were agitated continuously during the reaction which was initiated in an atmosphere of nitrogen at a pressure of about 35 to 40 p.s.i.g. The temperature in the reactor throughout the reaction was maintained at 122° F. The set point indicating member 169 of the recorder-controller 168 was set for a surface tension of 50 dynes/cm. As soon as the initially extracted sample of the reacting mass, with its high surface tension, reached the surface tension monitoring unit C, and thereafter as additional sample quantities followed during the progress of the reaction, the recorder-controller actuated the soap addition unit E to charge into the reactor 20, as demanded by the reaction, a 7.7% aqueous solution of potassium oleate as the surface tension-lowering emulsifying agent. The run was continued for a period of 27 hours at the end of which time there had been added a total of 0.9 part of soap per 100 parts of the original styrene monomer. Analysis showed that the resultant latex contained 19% solids having an average particle diameter of 4,000 Angstrom units. A latex produced from an identical recipe but by the conventional method, which is characterized by the presence of soap in the starting charge and no exercise of continuous control over the reaction, was found to have an average particle diameter of only 600 Angstrom units and a considerably higher viscosity than the latex produced by the continuously and demand-controlled method of the present invention.

*Example 2*

A styrene-butadiene polymerization was performed in equipment similar to that set forth in Example 1. The initial charge, in which no soap was present, was composed of 75 parts of butadiene, 25 parts of styrene and 300 parts of water and also contained 0.3 part of MTM-4, 0.5 part of potassium persulfate, 0.5 part of potassium hydroxide and 0.1 part of sodium bisulfite. The recorder-controller 168 was set for a surface tension of 45 dynes/cm. The reaction was continued for a period of 29 hours, and during that time the recorder-controller, in response to the bubble pressure measurements of the surface tension monitoring unit C, actuated the soap addition unit E to add to the reacting mass as demanded by the reaction a total of 3 parts of soap (the same 7.7% aqueous solution of potassium oleate as used in Example 1) per 100 parts of the original monomeric materials. Upon analysis, the finished SBR latex was found to have a solids content of 20.9% and an average particle diameter of 1,600 Angstrom units.

*Example 3*

A butadiene polymerization according to the present invention was performed in a reactor the initial charge of which was composed of 100 parts of butadiene and 300 parts of water and also contained 0.3 part of MTM-4, 0.5 part of potassium persulfate, 1.0 part of potassium hydroxide and 0.1 part of sodium bisulfite. The butadiene was charged separately into the reactor through a pressure control valve which maintained the pressure in the reactor at 55 p.s.i.g. The temperature in the reactor was maintained at 122° F., and the recorder-controller 168 was set for a surface tension of 55 dynes/cm. The run was continued for a period of 31 hours, at the end of which time the control system had added to the reacting mass as demanded by the reaction a total of 1.5 parts of potassium oleate (the same soap as in Examples 1 and 2) per 100 parts of the original monomer. The finished latex contained 28.6% solids and had an average particle diameter of 1,800 Angstrom units.

*Example 4*

A copolymerization of methacrylic acid, styrene and butadiene was performed in a reactor under temperature and pressure conditions substantially the same as set forth in Examples 1 and 2. The initial charge in the reactor was composed of 5 parts of methacrylic acid, 25 parts of styrene, 70 parts of butadiene, and 300 parts of water and also contained 0.3 part of MTM-4, 0.5 part of potassium persulfate, 0.1 part of sodium bisulfite and 0.5 part of "Sequestrene" (ethylenediaminetetraacetic acid, tetrasodium salt) as a chelating agent. The recorder-controller was set for a surface tension of 50 dynes/cm., and the soap solution employed consisted of an alkyl benzene sodium sulfonate (a detergent commercially available under the trademark "Ultrawet K"). The reaction was continued for a period of 22 hours, and the control system during this time caused a total of 3.5 parts of soap per 100 parts of the original monomeric materials to be added in accordance with the demands of the reaction. The finished terpolymer latex was found to contain 21.2% solids and to have an average particle diameter of 1,100 Angstrom units.

The foregoing examples are intended to be merely illustrative of the present invention and serve to show that the principles of the invention are applicable to the preparation of a wide range of polymers and copolymers by means of emulsion polymerizations which are initiated in the total absence of soap or emulsifying agents. Moreover, as those skilled in this art will readily appreciate from the examples, the method of performing an emulsion polymerization and the control thereof continuously during the progress of the reaction, as taught by the present invention, lead to the production of polymer latices having average particle diameters far in excess of those attained by the low and high initial soap concentration methods commercially feasible prior to this invention.

It will be realized that the invention may be practiced independently of the particular circuitry and equipment set forth in the preceding detailed description of a preferred embodiment of the apparatus. For instance, any manner of soap addition that is responsive to the magnitude of the air output signal of the recorder-controller 168 may be used. Such an alternate device may comprise a positive displacement pump with a pneumatically controlled delivery rate, such as a Lapp "Pulsafeeder" piston pump with a pneumatically adjustable stroke control so adjusted that an air signal from the recorder-controller 168 of 15 p.s.i.g. causes the pump to operate at maximum stroke length and an air signal of 3 p.s.i.g. reduces the stroke length to zero.

The invention finds application in any process which is controlled by adding an ingredient in response to the stimulus of changing surface tension. In addition, it can easily be adapted to performing any one of a series of other operations, such as applying heating or cooling media, electrical, magnetic or other forces to the process, or energizing switches, coils, or relays in response to the same stimulus.

The embodiment of the invention described above is suitable, for instance, for the emulsion polymerization or copolymerization of such monomers as styrene, α-methyl styrene, divinyl benzene, acrylonitrile, butadiene, isoprene, vinyl chloride, vinylidene chloride, vinyl acetate, and acrylic and methacrylic acids and their esters, such as ethyl acrylate and methyl methacrylate.

It will also be understood that the invention may be used to control other types of polymerization reactions and other chemical reactions that do not involve polymerization, whether they be aqueous or not. The only criterion is that the process to be controlled must involve the tendency to cause a change in surface tension which tendency is overcome by performing some operation on the process, such as the addition of an ingredient.

The surface-active agent, the addition of which to the process is being controlled by the invention, may be an aqueous, alcoholic, or other solution of a soap, such as an alkali or alkali metal salt of a fatty acid such as lauric, palmitic, stearic or oleic acid or of a rosin acid, or a solution of a synthetic detergent such as a salt of a sulfonated hydrocarbon, as for instance sodium dodecyl benzene sulfate, or a sulfated alcohol such as sodium lauryl sulfate, or a non-ionic surfactant. In addition any other surface-active agent, emulsifier, or dispersion agent may be used.

It is to be understood, therefore, that none of the many possible changes and modifications which may be made in the methods and apparatus according to this invention, as well as in the given ranges, proportions and magnitudes of materials and operating conditions involves in any way a departure from the spirit and scope of the invention which are defined by the appended claims.

Having thus described our invention, what we claim and desire to secure by Letters Patent is:

1. Apparatus for controlling a chemical reaction which is characterized by changes in the surface tension of the reacting mass during the progress of the reaction, comprising means for continuously extracting a sample from the reacting mass, vessel means for receiving a sufficient quantity of said extracted sample from said extracting means to maintain a constant level of continuously changing and replenished extracted sample in said vessel means throughout the course of the reaction, means for feeding gas under pressure into said vessel means at a predetermined point below the level of the top surface of said quantity of extracted sample to form a plurality of successive discrete bubbles in the latter, means for sensing the maximum pressure required to form each of said successive plurality of discrete gas bubbles, respectively, in said reacting mass sample as an index of the changing surface tension values thereof, and means responsive to the differences between the so indicated surface tension values and a predetermined set value thereof at which the reacting mass is to be maintained for adding a surface-active ingredient in response to demand therefor to the reacting mass in amounts sufficient to return the surface tension of the reacting mass substantially to said set value thereof.

2. Apparatus according to claim 1, further comprising means for maintaining the supply of said surface-active ingredient which is to be added to the reacting mass under a variable penumatic pressure which is at all times during the progress of the reaction a predetermined amount higher than the reaction pressure irrespective of variations in the latter.

3. Apparatus for controlling a chemical reaction which is being carried out in a reactor and is characterized by changes in the surface tension of the reacting mass from a desired set value during the progress of the reaction due to the consumption of a surface-active ingredient, comprising a sample extraction unit connected with said reactor for continuously extracting from the latter a sample of the reacting mass, a surface tension monitoring unit connected with said sample extraction unit for continuously receiving therefrom the extracted sample of the reacting mass and for continuously sensing changes in the surface tension values of the extracted sample throughout the course of the reaction, a surface tension indicating and control unit operatively connected with said monitoring unit and adapted to emit control signals corresponding to the differences between the sensed and set surface tension values, a source of supply of said surface-active ingredient, a feed line establishing communication between said source of supply and said reactor and having incorporated therein a first normally closed signal-operated control valve, differential pressure means interconnected between said reactor and said source of supply for maintaining in the latter a pneumatic pressure which at all times during the progress of the reaction is a predetermined amount higher than the pressure in said reactor, and a first signal line interconnecting said indicating and control unit with said first control valve for applyng said control signals to said first control valve to open the same accordingly and permit flow of said surface-active ingredient from said source of supply to said reactor as demanded by the reaction and in amounts sufficient to return the surface tension of the reacting mass substantially to said set value thereof.

4. Apparatus according to claim 3, said surface tension monitoring unit comprising means for blowing discrete gas bubbles in said extracted sample at a predetermined point below the level of the top surface of the latter, and means for sensing the maximum pressure required to blow said bubbles.

5. Apparatus according to claim 3, said sample extraction unit comprising a sample flow line communicating at one end with said reactor, a packed desorption column communicating with the other end of said sample flow line for receiving the extracted sample therefrom and for removing from the extracted sample entrapped gases and vapors, a second normally closed signal-operated control valve incorporated in said sample flow line, a sample-accumulating chamber the outlet of which communicates with said monitoring unit, a conduit establishing communication between said desorption column and said chamber and so arranged that the gas-free extracted sample flows by gravity into said chamber, a float disposed in said chamber for sensing the level of the accumulated sample therein, a signal-emitting controller connected with said float so as to be operative only when the level of the accumulated sample falls below a predetermined point in said chamber, and a second signal line interconnecting said controller and said second control valve, whereby the extent of opening of the latter, and thus the rate of extraction of the sample from said reactor, is determined by the level of the extracted sample accumulated in said chamber.

6. Apparatus according to claim 5, said desorption column comprising a substantially vertical cylindrical body provided with top and bottom end closures the former of which is vented to the outside of said body, a mass of tangled wire mesh material positioned just below said top end closure over the entire cross-section of said body and occupying a minor portion of the interior of said body, and a mass of packing bodies positioned below said wire mesh material and filling the entire remainder of the interior of said body, said sample flow line communicating with the interior of said body through said top end closure and at a point about half way down the length of said body, and said conduit communicating at the intake end thereof with the interior of said body through said bottom end closure.

7. Apparatus according to claim 6, said conduit comprising a pipe which in the region of said intake end thereof is of substantially circular cross-section and in the region of its discharge end is flattened into substantially oval cross-section, the axis of the discharge end region of said pipe being laterally offset relative to the axis of the intake end region of said pipe, and said pipe at said discharge end thereof being bent to one side to dispose the plane of its discharge opening in close proximity to and substantially parallel to the plane of the adjacent part of the wall of said sample-accumulating chamber.

8. Apparatus according to claim 5, said surface tension monitoring unit comprising an overflow cup, a sample-collecting vessel, said overflow cup communicating at its bottom with the outlet of said sample-accumulated chamber and further communicating from a point adjacent said bottom with the bottom of said sample-collecting vessel, said chamber being located at a higher elevation than the uppermost rim of said overflow cup, and said rim of said cup being located at a constant higher elevation than the uppermost rim of said vessel, whereby both said cup and said vessel are continuously filled to overflowing during the progress of the reaction, and the collected quantity of said sample in said vessel is maintained under a constant head, a gas supply tube extending vertically into said vessel from above the latter and terminating at its lowermost end in a narrow orifice disposed a predetermined distance below the plane of said uppermost rim of said vessel and the level of said collected quantity of sample in said vessel, a gas supply system for delivering pressurized gas into said gas supply tube at a predetermined rate to form a plurality of successive discrete bubbles in said collected quantity of the extracted sample in said vessel, a pressure sensing tube disposed coaxially within and fixedly connected with said gas supply tube and having its lowermost open end disposed a short distance above said orifice, and pressure-responsive means connected to the uppermost end of said pressure sensing tube, said pressure-responsive means being adapted to actuate said surface tension indicating and control unit in accordance with the maximum pressures required to form said bubbles of gas.

9. Apparatus according to claim 8, further comprising means for adjusting the vertical position of said gas supply tube relative to said vessel, to thereby enable adjustment of the extent of immersion of said orifice in said collected quantity of said sample in said vessel.

10. Apparatus according to claim 3, said differential pressure means comprising a differential pressure regulator having a sensing chamber and a control chamber separated by a flexible diaphragm, an apertured partition dividing said control chamber into two sections one of which is also bounded by said diaphragm, a valve member operable to close the aperture in said partition and mechanically connected to said diaphragm, and a pressure line establishing communication between said sensing chamber and the top of said reactor, said source of supply of said surface-active ingredient being in communication with said one section of said control chamber, the other section of said control chamber being in communication with a source of compressed gas, and said differential pressure regulator being provided with a narrow weep hole for a slow leak-type venting of said one section of said control chamber to the atmosphere.

11. In a control system for emulsion polymerization reactions wherein a continuous sample of the reacting mass is extracted from a reactor for measurements of its surface tension by the maximum bubble pressure method; apparatus for converting the sample to a condition suitable for said measurements, comprising desorbing means defining a path of flow for the extracted sample for removing from the latter foam and dissolved gases, a sample-accumulating chamber, a conduit establishing communication between said desorbing means and said chamber for gravity flow of the sample from the former and into the means for maintaining a constant level of the extracted sample in said chamber, a sample-collecting vessel in which said measurements are to be performed, and means interposed between the outlet of said chamber and the inlet of said vessel and operable to deliver the gas-free extracted sample from said chamber to said vessel at a constant pressure and flow rate.

12. In a control system for emulsion polymerization reactions wherein a continuous sample of the reacting mass is extracted from a reactor for measurements of its surface tension by the maxium bubble pressure method; apparatus for converting the sample to a condition suitable for said measurements, comprising a packed desorption column defining a path of flow for the extracted sample and having arranged across its top a mass of entangled wire mesh, a sample-accumulating chamber, a conduit establishing communication between the bottom of said column and said chamber for gravity flow of the sample from said column and into said chamber, means for maintaining a constant level of said sample in said chamber, an overflow cup in communication with said chamber, and a sample-collecting overflow vessel in communication with said overflow cup, the uppermost rim of said vessel being disposed at a predetermined level below the level of the uppermost rim of said cup, and said uppermost rim of said cup being disposed below the level of the extracted sample accumulated in said chamber, whereby the extracted sample is freed of foam and dissolved gases by said desorption column and is delivered to said vessel at a constant pressure and flow rate.

13. In a control system according to claim 12; said conduit comprising a pipe which in the region of the intake end thereof at the bottom of said column is of substantially circular cross-section and in the region of the discharge end thereof is flattened into substantially oval cross-section, the axis of the discharge end region of said pipe being laterally offset relative to the axis of the intake end region of said pipe, and said pipe at said discharge end thereof being bent to one side to dispose the plane of its discharge opening in close proximity to and substantially parallel to the plane of the adjacent part of the wall of said sample-accumulating chamber.

14. In a control system for emulsion polymerization reactions wherein a continuous sample of the reacting mass is extracted from a reactor for measurements of its surface tension by the maximum bubble pressure method; apparatus for measuring the surface tension of the sample, comprising a sample-collecting vessel, flow means communicating with said vessel to deliver the sample thereto at a constant pressure and flow rate and so as to ensure that said vessel is continuously filled to overflowing during the progress of the reaction, pressure means for delivering bubble-forming pressurized gas into said vessel at a predetermined rate and at a predetermined point below the top surface of the sample collected in said vessel, and pressure responsive means operatively connected with said pressure means for providing an indication of the maximum pressures required to form the respective bubbles in the sample as an index of the surface tension values of the sample and thus of the reacting mass.

15. In a control system for emulsion polymerization reactions wherein a continuous sample of the reacting mass is extracted from a reactor for measurements of its surface tension by the maximum bubble pressure method; apparatus for measuring the surface tension of the sample, comprising an overflow cup into which the sample as extracted from said reactor is continuously fed so as to fill said cup to overflowing, a sample-collecting overflow vessel, said cup communicating from a point below the level of the sample therein with said vessel, the uppermost rim of said overflow cup being located at a constant higher elevation than the uppermost rim of said vessel, whereby said vessel is continuously filled to overflowing during the progress of the reaction, and the continuously changing collected quantity of said sample in said vessel is maintained under a constant head, a gas supply tube extending into said vessel and terminating in a narrow orifice disposed a predetermined distance below the plane of said uppermost rim of said vessel and the level of said collected quantity of said sample in said vessel, a compressed gas source connected to said gas supply tube for delivering discrete bubble-forming pressurized gas into said gas supply tube at a predetermined rate, a pressure sensing tube communicating with the interior of said gas supply tube a short distance from said orifice, and pressure responsive means connected to said sensing tube for providing an indication of the maximum pressures required to form the respective bubbles in the sample as an index of the surface tension values of the sample and thus of the reacting mass.

16. In a control system according to claim 15; said measuring apparatus further comprising means for adjusting the vertical position of said gas supply tube relative to said vessel, to thereby enable adjustment of the extent of immersion of said orifice in said collected quantity of said sample in said vessel.

17. In a control system for emulsion polymerization reactions wherein soap initially contained in a supply tank therefor is automatically added from said tank to the reacting mass in a reactor in response to rises in the surface tension of the reacting mass; apparatus for establishing and maintaing a predetermined pressure differential between said reactor and said supply tank, comprising means for sensing the ambient pressure in said reactor, means for applying an elevated pneumatic pressure to the interior of said supply tank, and means coacting with said sensing means for controlling the magnitude of said pneumatic pressure applied to said supply tank, whereby said pneumatic pressure is always a predetermined amount higher than the reactor pressure irrespective of variations in the latter.

18. In a control system for emulsion polymerization reactions wherein soap initially contained in a supply tank therefor is automatically added from said tank to the reacting mass in a reactor in response to rises in the surface tension of the reacting mass; apparatus for establishing and maintaining a predetermined pressure differential between said reactor and said supply tank, comprising a differential pressure regulator having a sensing chamber and a control chamber separated by a flexible diaphragm, said sensing chamber being in communication with the interior of said reactor, and a source of pneumatic fluid under a pressure higher than the starting reaction pressure, said control chamber being in communication with both said source of said fluid and said supply tank and coacting with said diaphragm to control the magnitude of the pneumatic pressure applied to said soap in said supply tank, whereby the pneumatic pressure in said tank is always a predetermined amount higher than the reaction pressure irrespective of variations in the latter.

19. In a control system for emulsion polymerization reactions wherein soap initially contained in a supply tank therefor is automatically added from said tank to the reacting mass in a reactor in response to rises in the surface tension of the reacting mass; apparatus for establishing and maintaining a predetermined pressure differential between said reactor and said supply tank, comprising a differential pressure regulator having a sensing chamber and a control chamber separated by a flexible diaphragm, an apertured partition dividing said control chamber into two sections one of which is also bounded by said diaphragm, a valve member operable to close the aperture in said partition and mechanically connected to said diaphragm, a pressure line establishing communication between said sensing chamber and said reactor to permit application of the reactor pressure to one side of said diaphragm, and a source of pneumatic fluid under a pressure higher than the starting reactor pressure, said supply tank being in communication with said one section of said control chamber, the other section of said control chamber being in communication with said source of said fluid, and said differential pressure regulator being provided with a narrow weep hole slowly venting said one section of said control chamber to the atmosphere, whereby the pneumatic pressure in said tank is always a predetermined amount higher than the reactor pressure irrespective of variations in the latter.

References Cited by the Examiner
UNITED STATES PATENTS

| | | | |
|---|---|---|---|
| 1,643,243 | 9/1927 | Hatfield | 23—253 |
| 2,064,864 | 12/1936 | Temple. | |
| 3,025,277 | 3/1962 | Sterling | 260—80.7 |
| 3,031,273 | 4/1962 | Latinen | 23—285 |
| 3,047,548 | 7/1962 | Garrett | 260—80.7 |
| 3,056,661 | 10/1962 | Breen et al. | 23—285 |

MORRIS O. WOLK, *Primary Examiner.*

LEON J. BERCOVITZ, JOSEPH SCOVRONEK,
*Examiners.*

JOSEPH A. KOLASCH, *Assistant Examiner.*